Figure 1:
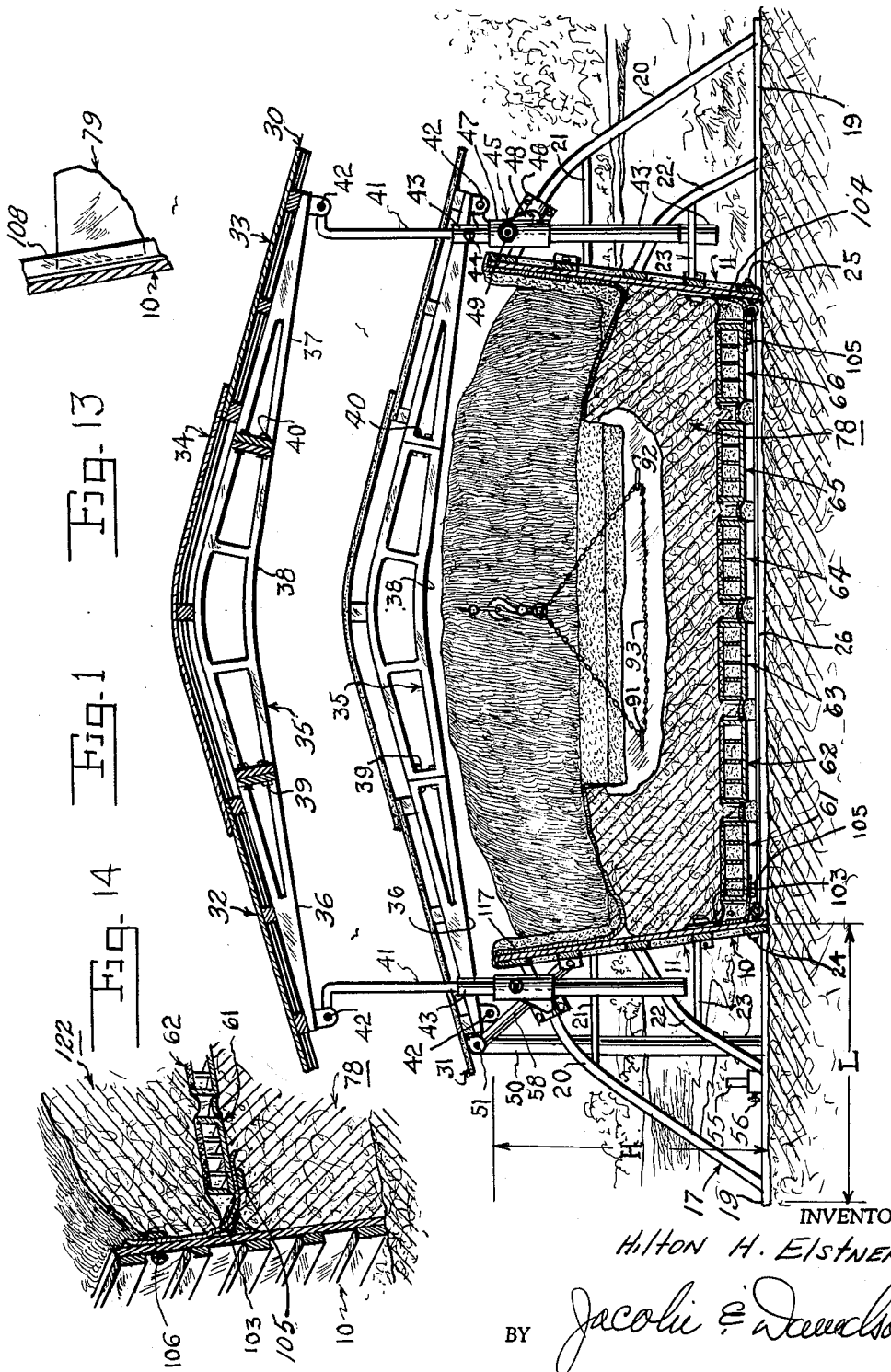

March 9, 1965  H. H. ELSTNER  3,172,740
PORTABLE HORIZONTAL SILO AND FEED DRYER
Filed Oct. 1, 1962  6 Sheets-Sheet 1

INVENTOR
Hilton H. Elstner
BY Jacobi & Donaldson
ATTORNEYS

March 9, 1965 H. H. ELSTNER 3,172,740
PORTABLE HORIZONTAL SILO AND FEED DRYER
Filed Oct. 1, 1962 6 Sheets-Sheet 3

INVENTOR
Hilton H. Elstner
BY Jacobi & Davidson
ATTORNEYS

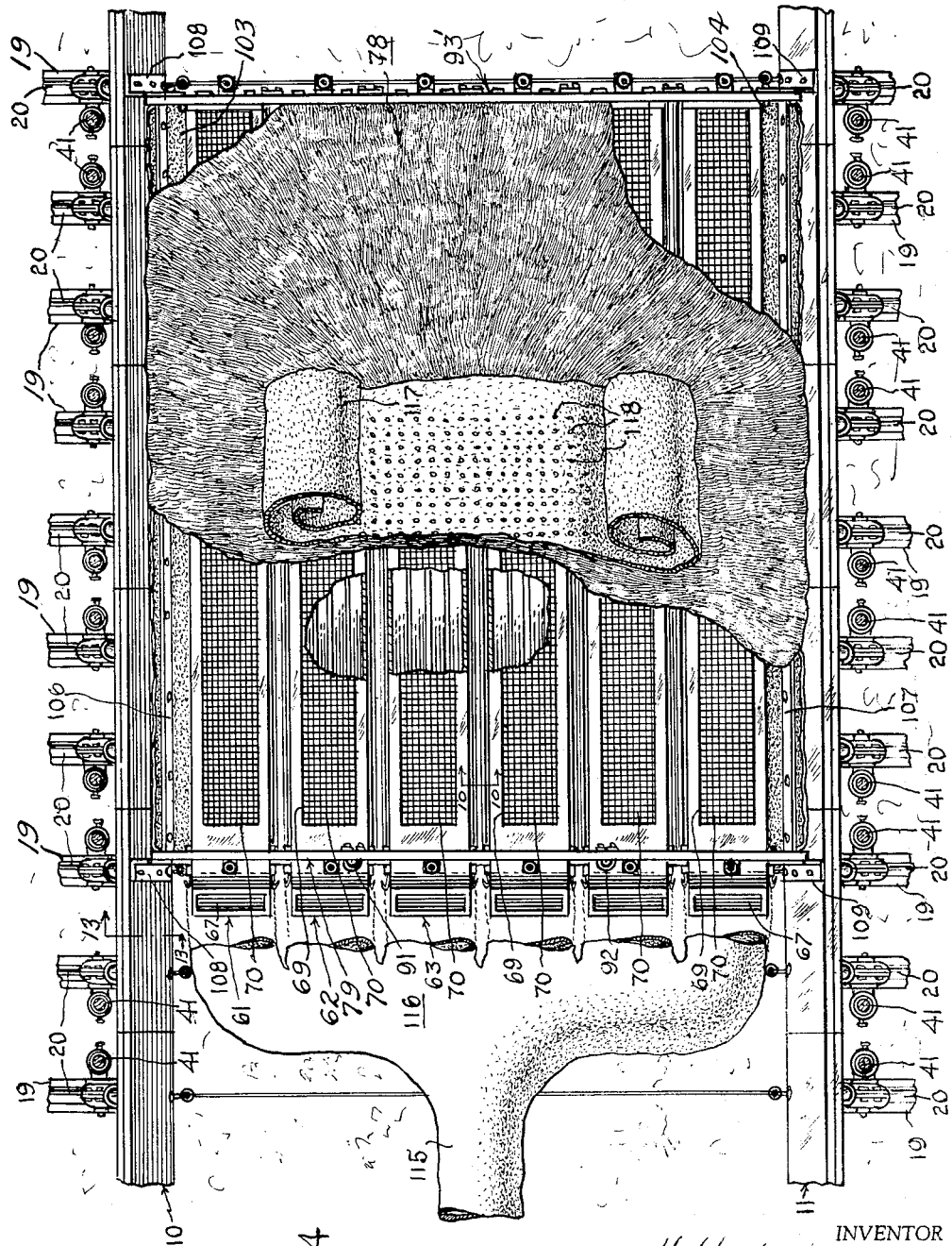

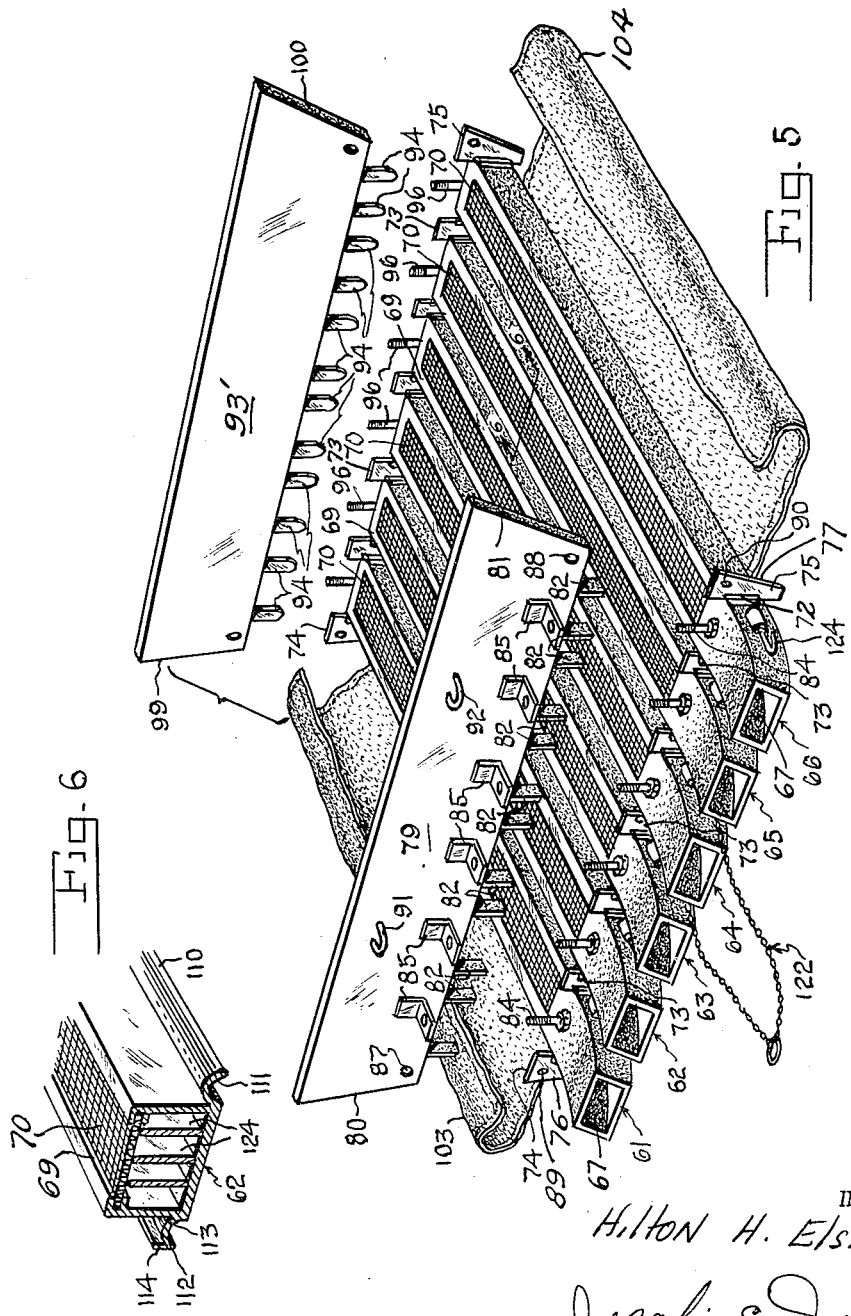

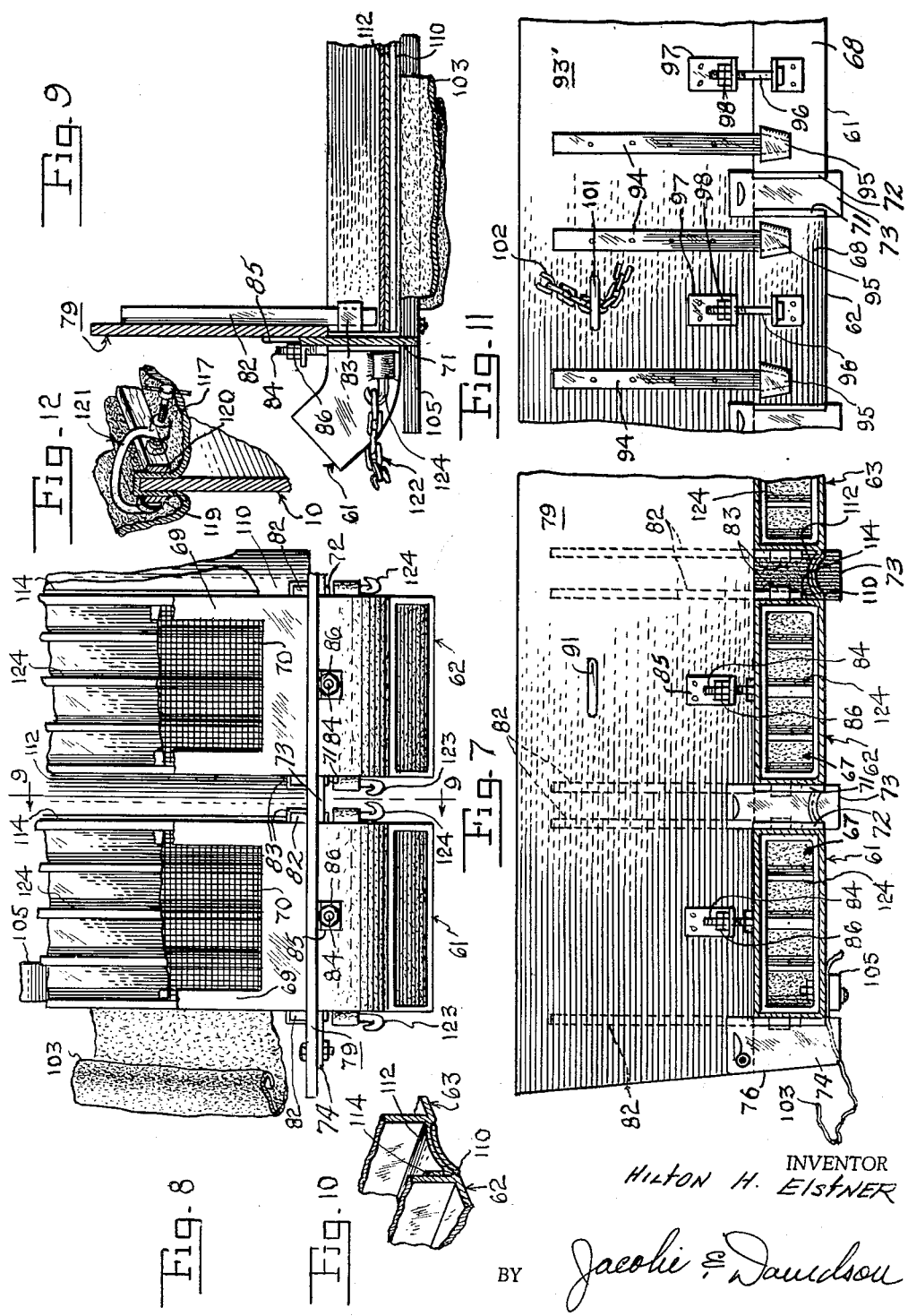

United States Patent Office 3,172,740
Patented Mar. 9, 1965

3,172,740
PORTABLE HORIZONTAL SILO AND FEED
DRYER
Hilton H. Elstner, R.F.D. 2, Box 52, Hallettsville, Tex.
Filed Oct. 1, 1962, Ser. No. 227,283
15 Claims. (Cl. 34—233)

This invention relates to the storage, drying and feeding of livestock feed, such as ensilage, and more particularly to a portable horizontal silo and feed dryer which may be conveniently utilized to store livestock feed in any desired amount and to dry the same and which also permits convenient consumption of such feed directly from the silo by cattle or other livestock, and this invention constitutes a continuation-in-part of my co-pending application Serial No. 20,168, filed April 5, 1960, Patent No. 3,063,416, November 13, 1962.

Heretofore ensilage has normally been stored in circular upright silos which constitute permanent and relatively costly structures and moreover, the capacity of these prior art silos could not be varied thereby necessitating the construction of a silo to accommodate the maximum quantity of ensilage which it was expected to store and this resulted in waste space and a greater cost than was sometimes necessary. It has also been proposed to store feed or ensilage in stacks on the ground or in pits dug in the ground, but this has not proved particularly satisfactory, in that the feed or ensilage is not properly confined or protected from the elements and furthermore, was easily scattered and wasted by cattle or livestock.

Before storing certain types of ensilage in the circular upright silos heretofore utilized, it was necessary to dry or cure the ensilage and where such drying or curing was accomplished artificially it was necessary to provide separate and rather costly drying apparatus for properly drying or curing the ensilage prior to storage and this also resulted in additional handling and transportation costs.

It is accordingly an object of the present invention to provide a portable horizontal silo and feed dryer which may be conveniently and economically constructed on any available plot of substantially level ground and in which the size of the silo may be conveniently varied to accommodate any desired quantity of ensilage or other feed.

A further object of the invention is the provision of a portable horizontal silo and feed dryer which may be conveniently and economically constructed from readily available material and in which the silo may be erected in any suitable location.

A still further object of the invention is the provision of a portable horizontal silo and feed dryer which may be constructed and erected without special tools or any particular special skill and which will serve to adequately contain, dry and protect ensilage or other feed for cattle or livestock.

Another object of the invention is the provision of a portable horizontal silo and feed dryer which is so constructed as to permit direct feeding by livestock from one or both ends of the silo and provision is also made for removal of a portion of one or both side walls to permit direct feeding by livestock from the sides of the silo intermediate the length thereof.

A further object of the invention is the provision of a portable horizontal silo and feed dryer, including side walls made up of removable sections to permit construction of a silo of any desired size, there being convenient releasable means for securing adjacent sections together, each section also being provided with suitable support and bracing means.

A still further object of the invention is the provision of a portable horizontal silo and feed dryer constructed of side walls, including wall sections diverging upwardly from the ground, there being tie bars connecting the lower edges of the opposed sections to prevent undue spreading thereof resulting from the weight of ensilage or other livestock feed within the silo.

Another object of the invention is the provision of a portable horizontal silo and feed dryer constructed of side wall sections to permit the provision of a silo of any desired size and including a plurality of roof units, there being one unit for each wall section and in which each roof unit is adjustably supported from the corresponding wall sections, the height of each roof unit being adjusted in accordance with the height of the feed stored there beneath and the roof supporting means being such as to permit operation thereof by a single person to raise or lower the roof unit.

Another object of the invention is the provision of a portable horizontal silo and feed dryer constructed of a plurality of separate wall sections and in which a wall section may be removed to provide access to the interior of the silo from the side and in which an auxiliary roof unit support is provided for supporting the roof unit above the opening provided by removal of the wall sections.

A further object of the invention is the provision of a portable horizontal silo and feed dryer constructed of separate side wall sections and including separate roof units, there being one roof unit for each side wall section and in which each roof unit is made up of end and center sections joined together to provide the roof unit thereby facilitating fabrication and handling of the roof structure.

A still further object of the invention is the provision of a portable horizontal silo and feed dryer in which the dryer includes a plurality of flues supported in side-by-side relationship between the side walls of the silo, such flues receiving heated or ambient air to be circulated upwardly through openings in the top of the flues through the ensilage stored in the silo to dry the same.

Another object of the invention is the provision of a portable horizontal silo and feed dryer in which the dryer includes a plurality of flues supported in side-by-side relationship between the side walls of the silo there being front and rear end walls removably secured to the flues to retain ensilage there between and means also being provided to prevent leakage of air from the spaces between the flues, as well as between the outermost flues and the side walls of the silo and means to prevent leakage between the ends of the front and rear walls and the side walls of the silo.

A further object of the invention is the provision of a portable horizontal silo and feed dryer in which the feed dryer includes a plurality of flues supported in side-by-side relationship between the side walls of the silo, such flues providing means for circulating air upwardly through feed stored thereon in the silo and there also being a sheet of material for disposition over the top of the stack of feed, such sheet being secured to the side and end walls of the silo and dryer means and also being provided with apertures therein to permit the escape of air.

A still further object of the invention is the provision of a portable horizontal silo and feed dryer in which the dryer includes a plurality of flues supported in spaced side-by-side relationship between the side walls of the silo there being means to facilitate the withdrawal of each flue longitudinally from beneath a stack of feed after completion of the drying operation.

Another object of the invention is the provision of a portable horizontal silo and feed dryer in which the dryer includes a plurality of flues supported in side-by-side relationship between the side walls of the silo and which upon completion of the drying operation may be withdrawn longitudinally from beneath the stack of feed in the silo and thereafter disposed on top of the stack of feed to dry a second stack of feed deposited on top of the flues disposed in the silo.

Another object of the invention is the provision of a portable horizontal silo and feed dryer constructed in such a manner as to permit convenient handling and erection of the various parts of the silo and dryer and in which no special equipment other than the conventional tractor-type hoist found on most farms is necessary for erection or dismantling of the silo and feed dryer.

Figure 2:
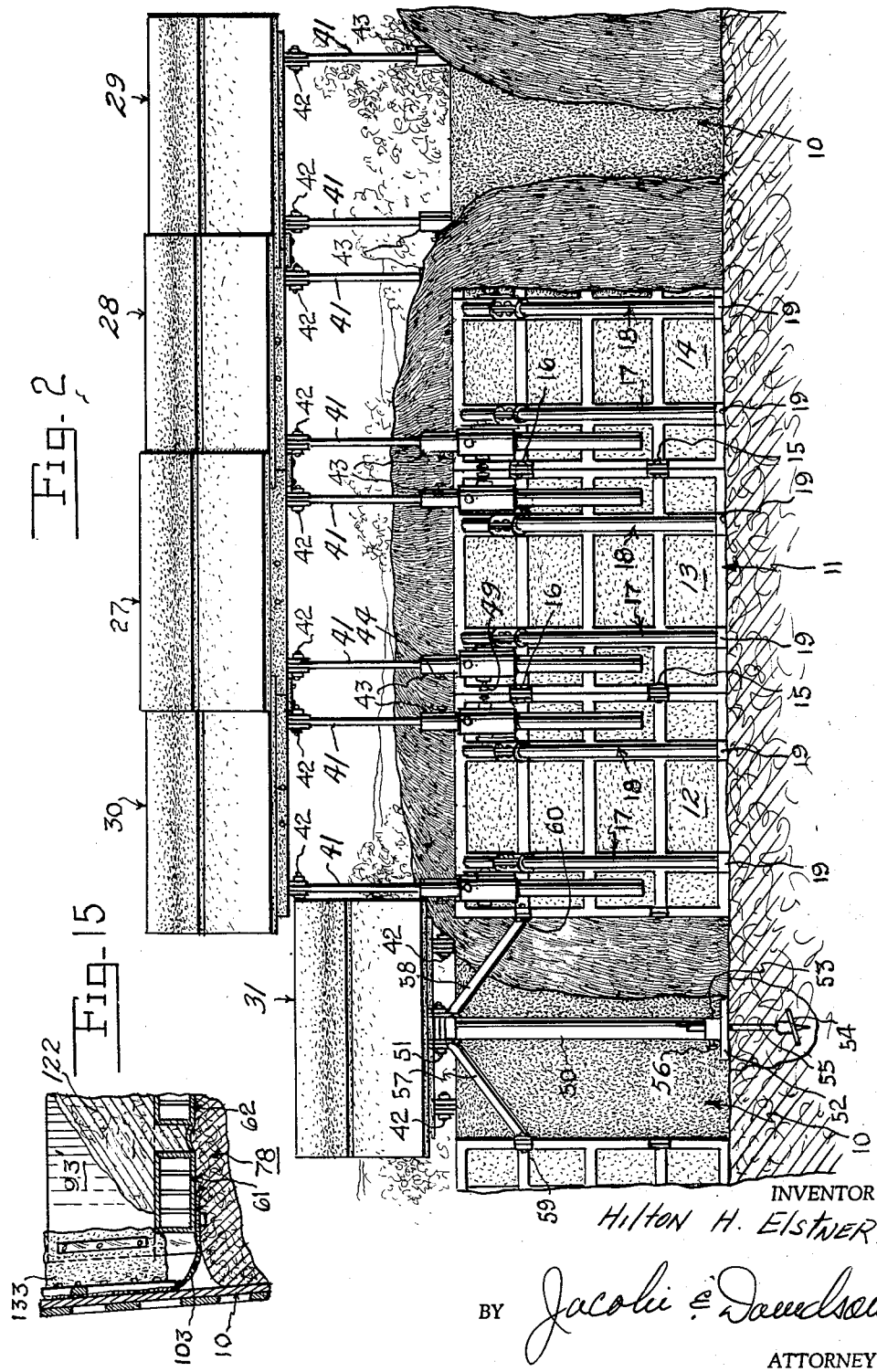
Figure 3:
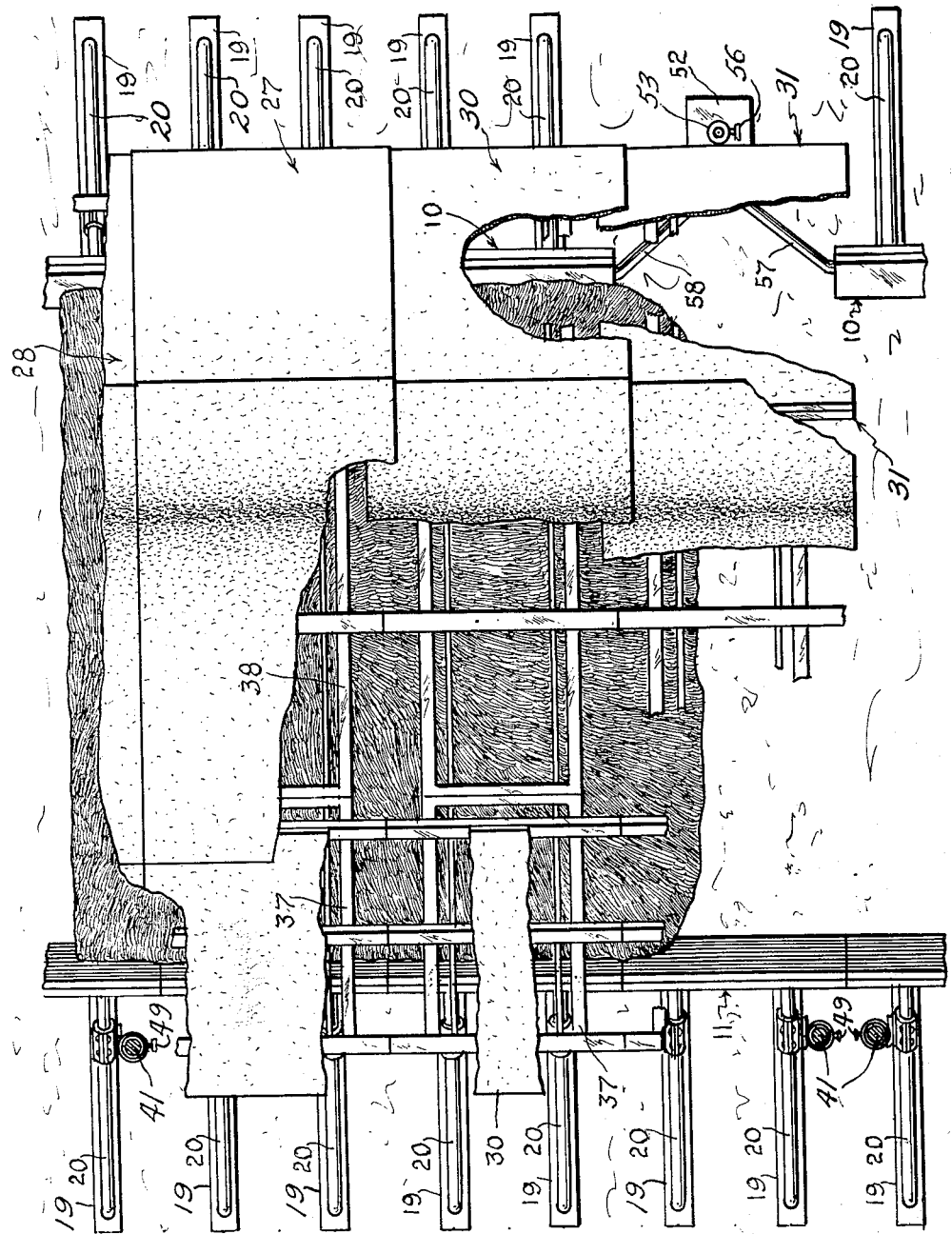

Further objects and advantages of the invention will be apparent from the following description taken in conjunction with the accompanying drawings wherein:

FIG. 1 is a longitudinal sectional view showing a portable horizontal silo and feed dryer constructed in accordance with this invention and showing the roof in two positions of adjustment and also showing in the lower position, the use of auxiliary roof supporting means which is utilized when one side wall section is removed to provide access to the interior of the silo through one side;

FIG. 2, a side elevational view of the silo shown in FIG. 1 and with parts broken away to show the structure and operation;

FIG. 3, a top plan view of the silo shown in FIG. 1 with parts broken away and in section for greater clarity;

FIG. 4, a top plan view with the roof removed and with parts broken away and in section and showing the arrangement of the dryer structure within the silo, together with a stack of feed therein and the disposition of the sheet of material on top of the stack of feed;

FIG. 5, an exploded view in perspective showing the dryer structure, together with the front and rear end walls utilized in conjunction therewith to retain a stack of feed in place during the drying operation;

FIG. 6, a fragmentary view in perspective taken substantially on the line 6—6 of FIG. 5 and showing one of the flues utilized in the dryer structure, together with the internal structure of such flue;

FIG. 7, a fragmentary front elevational view showing the dryer structure, together with the front end wall, as well as the means utilized for preventing leakage of air between adjacent flues of the dryer structure;

FIG. 8, a fragmentary top plan view of the structure shown in FIG. 7;

FIG. 9, a fragmentary sectional view taken on the line 9—9 of FIG. 8;

FIG. 10, a fragmentary sectional view in perspective taken substantially on the line 10—10 of FIG. 4 and showing the cooperating relationship between the transversely extending bottom flanges on adjacent flues;

FIG. 11, a fragmentary elevational view similar to FIG. 7, but showing the rear end of the dryer section, together with the rear end wall and manner of supporting the same on the flues of the dryer structure;

FIG. 12, a fragmentary sectional view in perspective showing the manner of securing the sheet of material for covering the stack of feed to the side walls of the silo;

FIG. 13, a fragmentary sectional view taken substantially on the line 13—13 of FIG. 4 and showing the manner in which means is provided on the side walls of the silo for engaging and supporting the end walls secured to the dryer structure;

FIG. 14, a fragmentary sectional view in perspective showing the use of the dryer apparatus on top of a stack of feed previously dryed and for drying a further stack of feed disposed on the top of the dryer structure; and FIG. 15, a fragmentary view in perspective similar to FIG. 14, and showing the means for providing an air seal between the ends of the front and rear end walls and the side walls of the silo when the drying apparatus is in the position shown in FIG. 14.

With continued reference to the drawings there is shown a portable horizontal silo and feed dryer constructed in accordance with this invention and in which the silo may well comprise spaced side walls 10 and 11 which as clearly shown in FIG. 1, are supported on the ground and diverge upwardly. Each side wall 10 and 11 is composed of removable sections as shown at 12, 13 and 14 in FIG. 2 and such sections are placed end to end to provide a silo of the desired horizontal length and the sections of the side walls may be secured together by screw threaded or other suitable fastening means 15 and 16. Each side wall section is supported by a plurality of braces 17 and 18 which are identical in construction and consequently, a description of one brace will suffice for all. As clearly shown in FIGS. 1, 2 and 3, the brace 17 includes a foot member 19 secured to the side wall section 12 adjacent the lower edge and projecting outwardly in engagement with the ground. A brace member 20 is secured to the side wall section 12 adjacent the upper edge and the brace member 20 extends outwardly and downwardly and is connected to the foot member 19 adjacent the outer end. A tie member 21 is connected between the side wall section 12 and the brace member 20 in order to provide additional reinforcement. If desired, or found necessary, a second brace member 22 may be secured to the side wall section 12 intermediate the height thereof and the second brace member 22 also extends outwardly and downwardly and is connected to the foot member 19. A tie member 23 may also be provided between the second brace member 22 and the side wall section 12 in order to provide additional reinforcement. As clearly shown in FIG. 1, the length L of the foot member 19 is substantially equal to the height H of the side wall section 12 and, therefore, the foot member 19, together with the brace members 20 and 22 provide adequate support for the side wall section 12 and prevent tipping of the same, regardless of the load imposed thereon by ensilage or other feed disposed within the silo structure between the side walls 10 and 11.

The side wall sections may be constructed of plywood or any other suitable material and will be of an appropriate size and weight to permit convenient storage, transportation and handling and the brace members 20 and 22, as well as the tie members 21 and 23 may be conveniently formed from tubular metal stock. In order to prevent spreading of the side walls 10 and 11 at the bottom due to the pressure exerted by ensilage or other feed disposed between the side walls, there may be provided in each side wall section, one or more eye bolts 24 and 25 and such eye bolts may be connected by tie bars 26, as clearly shown in FIG. 1.

Since it is desirable to protect ensilage or other feed stored in the silo of the invention from the elements, there may be provided a roof structure in the form of a plurality of roof units 27, 28, 29, 30 and 31 as clearly shown in FIG. 2, and, of course, a sufficient number of units will be provided to cover the entire length of the silo, there being one unit for each side wall section and, as shown in FIG. 2, the roof units are disposed in overlapping relationship from the center unit 27 outwardly toward both ends of the silo. The roof units are all of similar construction and, therefore, a description of one will suffice for all and as clearly shown in FIG. 1, the roof unit 30 comprises two side sections 32 and 33 and a center section 34. The side and center sections of each roof unit are supported by trusses 35 which provide rafters and each truss is provided with end sections 36 and 37 secured to the side roof sections 32 and 33 respectively and an intermediate section 38 secured to the center roof section 34. The side truss section 36 may be secured to the intermediate truss section 38 by screw threaded or other suitable fastening means 39 and in a similar manner, the side truss section 37 may be secured to the intermediate truss section 38 by screw threaded or other suitable fastening means 40. In this manner, there is provided a roof structure in which the side and center roof sections, together with the truss sections attached thereto may be conveniently stored and handled and thereafter conveniently assembled to form a roof unit and as clearly shown in FIG. 1, the center roof section 34 overlaps the side sections 32 and 33 in order to provide a water-tight structure.

In view of the fact that the height of ensilage or other feed stored in the silo of this invention will vary, it is desirable to vary the height of the roof structure in order to provide for adequate protection and at the same time, permit ventilation of the interior of the silo and for this purpose there may be provided roof supporting means in the form of a pair of uprights secured to each roof unit at the opposite ends thereof and adjustably secured to each side wall section. As clearly shown in FIGS. 1 and 2, each upright may well comprise an upper elongated member 41 pivotally secured at 42 to the roof unit 30 and the upper elongated member 41 is telescopically received in a lower tubular elongated member 43. The upper elongated member 41 may be adjustably secured in position in the lower tubular member 43 by a set screw or other suitable fastening means 44. In order to adjustably attach the lower tubular member 43 to the side wall section there may be provided a fixture 45 for each upright and each fixture may well comprise clamp means 46 secured to a brace member 20 of the corresponding side wall section and a sleeve 47 pivotally mounted on the clamp means 46, as shown at 48, for movement about a horizontal axis and with the lower tubular member 43 slidably received in the sleeve 47. In order to secure the lower tubular member 43 in adjusted position in the sleeve 47, there may be provided a set screw or other suitable means 49 mounted in the sleeve 47 and engaging the lower tubular member 43. Also, if desired, there may be provided suitable means, not shown, for locking the sleeve 47 against pivotal movement with respect to the clamp means 46.

With the roof supporting structure above described, it will be obvious that the roof may be supported at any desired elevation above the silo and furthermore, by reason of the particular supporting structure employed, the roof may be raised or lowered by one man merely by raising or lowering one side at a time, which operation is made possible by reason of the pivotal connection of the upper elongated member 41 of each upright to the roof unit and the pivotal connection of the upright through the sleeve 47 to the clamp means 46 which permits raising or lowering one side of the roof unit at a time, such one side being clamped in position while the other side is being raised or lowered.

While access may be had to the interior of the silo from opposite ends, it is also some times desirable to provide access thereto from either side and for this purpose, as clearly shown in FIG. 2, one side wall section on either side may be removed thereby providing access to the interior. Since the removal of a side wall section eliminates the support for the roof unit corresponding to that section an auxiliary roof support must be provided and as clearly shown in FIGS. 1 and 2, such auxiliary roof support may well comprise a post 50 pivotally secured at 51 to the roof unit 31 and on the lower end of the post 30 there is provided a ground engaging base plate 52 and on the upper surface of the base plate 52, a collar 53 is secured in alignment with an aperture in the base plate 52. An auger 54 to be screwed into the ground is provided and projecting upwardly from the auger 54 is a rod 55 which passes through the aperture in the plate 52 and through the collar 53 and the rod 55 may be secured in adjusted position by a set screw or other suitable means 56 mounted in the collar 53 and engaging the rod 55. The auger 54 and rod 55 projecting upwardly therefrom in engagement with the base plate 52 prevents movement of the post 50 outwardly or inwardly about the pivotal mounting 51 on the roof unit 31 and also prevents inadvertent upward movement of the post 50 in the event of a high wind which might tend to raise the roof unit 31. In order to further stabilize the roof structure when utilizing the auxiliary roof support in the form of the post 50 there may be provided diagonal braces 57 and 58 secured to the roof unit 31 at the pivotal mounting 51 and the diagonal braces 57 and 58 extend in opposite directions and are secured at their lower ends 59 and 60 to the adjacent side wall sections of the side wall from which one side wall section has been removed to provide access to the interior of the silo.

As should be apparent, additional roof units 31 can be added in longitudinal alignment with, and to the left of the roof unit 31, as shown in FIGURE 2. As should also be apparent, with additional roof units 31 (not shown), a post, such as that designated by the numeral 50 in FIGURE 2, would be used and it would not be necessary to use the diagonal braces 57 and 58 with inner disposed roof sections, the same being used only with the outermost or end section.

The purpose of the additional roof section or roof sections is to provide a shelter for the livestock during their feeding, and to keep them free of any mud surface. Moreover, the additional roof section(s) provide a safety factor, in that they yield more space, and thus prevent bodily contact between animals feeding at the structure provided hereby. If desired, as the feed is used, the additional roof section(s) 31 (not shown) can be progressively removed so that only a given amount of shelter remains, and with the removal of each end additional roof section 31, the diagonal braces 57 and 58 associated therewith can be coupled with the pole 50 and roof section of the next adjacent inwardly disposed roof section.

With particular reference to FIGS. 4 and 5, the feed dryer utilized in connection with the silo of this invention may well comprise a plurality of flues 61, 62, 63, 64, 65 and 66 and as clearly shown in FIG. 1, such flues are supported in spaced side-by-side relationship between the side walls 10 and 11 and the flues extend longitudinally of the silo. Each flue is open at the forward end as shown at 67 and is closed at the rear end as shown at 68 in FIG. 11. Furthermore, each flue is provided with a longitudinal opening 69 covered by a grill 70 for permitting the discharge of air upwardly from the flues.

As mentioned above, the flues are disposed in spaced side-by-side relationship and in order to prevent the escape of air from the spaces between the flues, there are provided vertical slideways 71 and 72 on each side of each flue as clearly shown in FIG. 8 and slidably received in the slideways 71 and 72 are closure panels 73 which may be conveniently removed and inserted when necessary and such panels serve to prevent the escape of air from between the adjacent flues. Side panels 74 and 75 are provided which engage the slideways in the outermost flues 61 and 66 and the outer side edges 76 and 77 of the side panels 74 and 75 are beveled to correspond with the inclination of the side walls 10 and 11 to prevent the escape of air at these points. Air sealing panels are provided at both ends of the flues, as clearly shown in FIG. 5, but since such panels are all duplicates, it is believed that the above description thereof will suffice for both ends of the dryer structure.

As best shown in FIGS. 1 and 4, the flues comprising the dryer structure are supported on the ground between the side walls 10 and 11 of the silo and ensilage or other feed is disposed in the form of a stack 78 on top of the flues and while the side walls 10 and 11 of the silo serve to confine the stack of feed 78 at the sides, it is also desirable to provide means for confining such stack at the ends of the silo or at the ends of the dryer structure depending upon the length of the stack 78. With particular reference to FIGS. 4 and 5, the means for confining the stack of feed 78 at the ends may well comprise a front end wall 79 beveled at the opposite ends 80 and 81 to correspond with the inclination of the side walls 10 and 11 of the silo and the front end wall 79 may be provided with a plurality of downwardly projecting bars 82 which are removably received in sockets 83 provided on opposite sides of each flue as shown in FIGS. 7, 8 and 9. The front end wall 79 may be removably secured in place on the top of the flues by screw threaded or other suitable fastening means 84 projecting upwardly from each flue and through brackets 85 secured to the front end wall 79 and a nut 86 received on the fastening means 84 serves to removably secure the front end wall 79 in place as shown in FIGS. 5, 7, 8 and 9. The front end wall 79 may also be provided with apertures 87 and 88 adjacent opposite ends thereof, as shown in FIG. 5, for receiving bolts or other suitable means extending through apertures 89 and 90 in the closure panels 74 and 75, also shown in FIG. 5, to removably retain the same in place and also, if desired, similar bolt receiving apertures may be provided in the end wall 79 for securing the other closure panels in place. To facilitate convenient handling of the end wall 79, there may be provided eye bolts 91 and 92 thereon for engaging a hoisting chain 93 or other suitable means as shown in FIG. 1, to permit installation or removal of the end wall 79.

In a similar manner, a rear end wall 93', shown in FIG. 5, is provided having downwardly projecting bars 94 removably received in sockets 95 on the rear end 68 of the flues and the flues as shown in FIG. 11 may also be provided on the rear ends thereof with upwardly projecting bolts 96 engaging brackets 97 on the rear wall 93' and nuts 98 received on the bolts 96 serve to removably retain the rear end wall 93' in place. The opposite ends 99 and 100 of the rear end wall 93' may be beveled, as shown in FIG. 5, to correspond with the inclination of the side walls 10 and 11 of the silo. The rear end wall 93' may also be provided with eye bolts 101, as shown in FIG. 11, for receiving a hoisting chain or other suitable means 102 to permit convenient handling of the same.

As best shown in FIG. 5 the outermost flues 61 and 66 may be provided with strips of flexible material 103 and 104 secured to the lower side of each of these flues and for this purpose, a bar 105 may extend longitudinally of each flue 61 and 66 as clearly shown in FIGS. 7 and 9 and with the strip of material firmly clamped between the bar 105 and the bottom wall of each of the flues 61 and 66. The strips of material 103 and 104 extend across the space between the outermost flues 61 and 66 and the side walls 10 and 11 and as clearly shown in FIG. 4, these strips of material may be secured to the side walls 10 and 11 by suitable longitudinally extending bars 106 and 107 to prevent leakage of air through these spaces. It is also to be noted that as shown in FIGS. 4 and 13, the side walls 10 and 11 are provided with angle members 108 and 109 thereon which engage and support the opposite ends of the front and rear end walls 79 and 93'.

As shown in FIG. 6, each flue is provided at the lower side thereof with a longitudinally extending flange 110 having a downwardly opening concave recess 111 and on the opposite lower side of the flue 62 there is provided a longitudinally extending flange 112 having a downwardly opening concave recess 113 and terminating in a vertical longitudinally extending flange 114. These flanges are provided on all of the flues and as best shown in FIG. 10, provide a spacing and sealing means between the flues, since as clearly shown, the concave recess of the flange 112 serves to receive the upwardly curving portion of the flange 110 of the adjacent flue and the longitudinally extending vertical flange 114 engages the side wall of the adjacent flue in order to provide spacing means between the adjacent flues 62 and 63.

In utilizing the dryer apparatus of this invention, the flues are positioned in the silo as clearly shown in FIGS. 1 and 4, and ensilage or other feed in the form of a stack 78 is deposited on the upper surface of the flues between the side walls 10 and 11 of the silo and the front and rear end walls 79 and 93' of the dryer apparatus. A suitable flexible conduit 115 terminating in a manifold section 116 is connected to the open ends 67 of the flues and the conduit 115 may be connected to a suitable blower for supplying heated or ambient air to the interior of the flues which will then be circulated upwardly through the opening 69 in the flues and through the stack of feed to dry the same. Air is prevented from escaping from the stack of feed, except at the upper surface thereof, by reason of the closure panels 73 between the flues, the closure panels 74 and 75 at the sides of the outermost flues between the same and the side walls 10 and 11 of the silo and by the sheets or strips of flexible material 103 and 104 extending from the outermost flues to the side walls 10 and 11 of the silo. If desired, and in order to enhance the drying action, the top of the stack of feed 78 may be covered by a sheet of flexible material 117 which is impervious to air passage, except in the center section thereof which is provided with a plurality of apertures 118 to permit the escape of air from the stack of feed 78. As best shown in FIG. 12, the edges of the sheet 117 may be secured to the upper edges of the side walls 10 and 11 of the silo and to the upper edges of the front and rear end walls 79 and 93' of the dryer apparatus by longitudinally extending strips or bars 119 and 120, FIG. 12, which engage the sheet 117 and the bars 119 and 120 are held in clamping relationship with the sheet 117 and side wall 10 by suitable clamps 121 which may be placed at spaced intervals.

Upon completion of the drying operation, the flues are removed one by one, and this may be conveniently accomplished by attaching a chain or other suitable means 122, FIG. 9, to hooks 123 and 124, FIG. 8, provided on opposite sides of each flue, as shown in FIGS. 8 and 9, and a tractor or other suitable pulling means may be utilized to withdraw each flue from beneath the stack of feed 78. It is, of course, understood that prior to withdrawing the flues from beneath the stack of feed that the end walls 79 and 93' are removed, as well as the sealing panels 73 between the flues and the panels 74 and 75 between the outermost flues and the side walls and furthermore, the strips of flexible material 103 and 104 are disengaged from the side walls 10 and 11. Upon withdrawal of the flues from beneath the stack of feed, the same is thereupon in condition for feeding by cattle, either from one or both ends of the silo or through a side opening provided by removal of one of the side wall sections as fully described above. The ends of the silo may be left open to provide for convenient access by cattle or the same may be closed by suitable means, such as the gate fully disclosed in my above identified co-pending application, now Patent No. 3,063,416, November 13, 1962. It is also to be understood that different forms of closure gates may be utilized if desired.

Where large quantities of ensilage or other feed are to be dryed and stored in the silo of this invention, it may be advantageous to accomplish the drying operation in several stages and this may be done, of course, by positioning the flues at successive locations longitudinally of the silo and also if desired, the flues may be positioned successively in at least two vertical positions and for this purpose, as shown in FIG. 14, the flues may be disposed on the upper surface of a stack of feed 78 which has already been dried and a second stack of feed 122 may be deposited on the upper surfaces of the flues supported by the lower stack of feed 78. In this position, of course, the ends of the front and rear end walls 79 and 93' are spaced from the side walls 10 and 11 due to the diverging relationship of such side walls and in order to prevent the escape of air around the ends of the front and rear end walls 79 and 93' as shown in FIG. 15, there may be provided strips of flexible material 133 secured to the front and rear end walls 79 and 93' adjacent the ends thereof and also secured to the side walls 10 and 11 of the silo. As in the previous use of the drying apparatus, the strips of flexible material 103 and 104 will be secured to the side walls 10 and 11 to confine the drying air within the stack of feed 122. Upon completion of this drying operation, the flues may be withdrawn as before and the entire stock of feed available for direct feeding from the silo by cattle or other livestock.

Since an appreciable load is present on the grills 70 in the upper surfaces of the flues, there may be provided within each flue longitudinally extending upright partitions 124 which serve to provide an adequate support for the grill 70 and also reinforce the entire flue structure, as well as provide for an equalized distribution of air throughout the length of the flue and throughout the area of the grill 70. This structure is clearly shown in FIG. 6.

It will be obvious that by the above described invention there has been provided a portable horizontal silo and feed dryer which may be economically constructed and conveniently utilized without requiring skilled labor and with a minimum of personnel, since the silo, as well as the dryer apparatus are constructed in easily stored and handled sections and by reason of this structure, the silo may be conveniently erected or dismanteled and the size thereof extended or reduced as required and furthermore, drying of ensilage or other feed may be accomplished without the necessity for transferring the feed from a drying apparatus to a storage apparatus, it only being necessary to harvest the feed and deposit the same in the silo, whereupon the drying operation may be accomplished and the feed thereafter be immediately available for direct feeding by cattle or other livestock.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A portable horizontal silo and feed dryer, said silo comprising spaced side walls supported on the ground and diverging upwardly, each side wall being composed of removable sections placed end to end, whereby the horizontal length of said silo may be varied, means for securing said sections together, a plurality of braces for supporting each section, each brace including a foot member secured to a section adjacent its lower edge and projecting outwardly in engagement with the ground, a brace member secured to the section adjacent the upper edge of the latter and extending outwardly and downwardly and connected to said foot member adjacent the outer end of the latter and a tie member connected between the section and said brace member, tie bars connecting the lower edges of opposed sections at spaced points, a roof structure including a plurality of roof units corresponding to the number of side wall sections and means for adjustably supporting each roof unit from the corresponding side wall section, said roof units being disposed in overlapping relationship from the center unit outwardly toward both ends of said silo, said dryer comprising a plurality of flues supported in spaced side-by-side relationship between said side walls and extending longitudinally of said silo, means for closing the space between adjacent flues, each flue being open at one end for receiving air and closed at its opposite end, each flue having a longitudinal opening in the top covered by a grill for discharging air upwardly, vertical slideways on opposite sides of each flue adjacent the flue ends, closure panels removably received in said slideways for closing the ends of the spaces between said flues and between the outermost flues and said sidewalls, sockets on opposite sides of each flue adjacent the open flue end, a front end wall disposed above said flues and having downwardly projecting bars received in said sockets, means for removably securing said front end wall to said flues, sockets on the closed ends of said flues, a rear end wall disposed above said flues and having downwardly projecting bars received in said last named sockets, the side edges of said front and rear end walls being beveled to match the inclination of said sidewalls, a strip of flexible material secured to the lower side of the outermost flue on each side, said strip of material extending between said slideways and being secured to the adjacent side wall, whereby feed may be deposited on said flues between said side walls and end walls and air circulated upwardly through said feed to dry the same and a sheet of flexible material for disposition over the feed and means for securing the edges of said sheet to the top edges of said side walls and end walls, said sheet having apertures therein for the escape of air.

2. A portable horizontal silo and feed dryer as defined in claim 1, in which each roof unit comprises two side roof sections and a center roof section, supported by a plurality of trusses providing rafters, each truss having end truss sections secured to said side roof sections and an intermediate truss section secured to said center roof section and means for detachably securing each end truss section to said intermediate truss section.

3. A portable horizontal silo and feed dryer as defined in claim 1, in which said means for adjustably supporting each roof unit comprises a plurality of uprights pivotally secured to each roof unit adjacent opposite ends of the latter, each upright comprising an upper elongated member telescopically received in a lower tubular elongated member, a set screw for adjustably securing said upper member in position in said lower member, a supporting fixture for each upright, each fixture comprising clamp means secured to a brace member of the corresponding side wall section, a sleeve piovtally mounted on said clamp means for movement about a horizontal axis, said lower elongated member being slidably received in said sleeve and a set screw for securing said lower member in adjusted position in said sleeve.

4. A portable horizontal silo and feed dryer as defined in claim 1, in which said means for adjustably supporting each roof unit comprises a plurality of uprights pivotally secured to each roof unit adjacent opposite ends of the latter, each upright comprising an upper elongated member telescopically received in a lower tubular elongated member, means for adjustably securing said upper member in position in said lower member, a supporting fixture for each upright, each fixture comprising clamp means secured to a brace member of the corresponding side wall section, a sleeve pivotally mounted on said clamp means for movement about a horizontal axis, said lower elongated member being slidably received in said sleeve and means for securing said lower member in adjusted position in said sleeve.

5. A portable horizontal silo and feed dryer as defined in claim 1, in which said means for adjustably supporting each roof unit comprises a plurality of uprights pivotally secured to each roof unit adjacent opposite ends of the latter and a fixture mounted on the corresponding side wall section for adjustably supporting each upright.

6. A portable horizontal silo and feed dryer as defined in claim 1, in which one side wall section and the means for supporting the adjacent end of the corresponding roof unit are removed to provide access to the interior of the silo and an auxiliary roof support comprising a post pivotally secured at the upper end to the corresponding roof unit, a ground engaging base plate on the lower end of said post, said plate having an aperture, a collar secured to said plate in alignment with said aperture, an auger to be screwed into the ground, a rod on said auger slidably received in said aperture and collar, means on said collar to secure said rod in adjusted position and diagonal braces extending from the upper end of said post in opposite directions and secured to the adjacent side wall sections.

7. A portable horizontal silo and feed dryer as defined in claim 1, in which one side wall section and the means for supporting the adjacent end of the corresponding roof unit are removed to provide access to the interior of the silo and an auxiliary roof support comprising a post pivotally secured at the upper end to the corresponding roof unit, a ground engaging base plate on the lower end of said post and diagonal braces extending from the upper end of said post in opposite directions and secured to the adjacent side wall sections.

8. A portable horizontal silo and feed dryer as defined in claim 1, in which the means for closing the space between adjacent flues comprises a longitudinally extending flange on one lower edge of each flue and a longitudinally extending flange on the other lower edge of each flue, the flanges on adjacent flues overlapping to provide spacing and air sealing means between adjacent flues.

9. A portable horizontal silo and feed dryer as defined in claim 1, in which each flue is provided with a plurality of longitudinally extending vertically disposed partitions to facilitate air distribution and provide reinforcing means.

10. A portable horizontal silo and feed dryer as defined in claim 1, in which each flue is provided with means secured to opposite sides adjacent the open end to facilitate attachment of pulling means to withdraw each flue from beneath a stack of feed in said silo.

11. A portable horizontal silo and feed dryer as defined in claim 1, in which said means for securing said front end wall to said flues comprises a screw threaded upstanding member on each flue adjacent the open end and brackets on said front wall for receiving said screw threaded members.

12. A portable horizontal silo and feed dryer as defined in claim 1, in which the means for securing said sheet to said side walls and end walls with said sheet disposed over the upper edges of said side and end walls, comprises a pair of elongated bars engaging said sheet on opposite sides of said side and end walls and a plurality of clamps engaging said bars to clamp said sheet in place.

13. A portable horizontal silo and feed dryer as defined in claim 1, in which strips of flexible material are secured to opposite side edges of said front and rear end walls and to the adjacent side walls to provide air sealing means.

14. A portable horizontal silo and feed dryer, said silo comprising spaced side walls supported on the ground, each side wall being composed of removable sections placed end to end, whereby the horizontal length of said silo may be varied, means for securing said sections together, a brace for supporting each section, said brace including a foot member secured to a section adjacent its lower edge and projecting outwardly in engagement with the ground, a brace member secured to the section adjacent the upper edge and extending outwardly and downwardly and connected to said foot member adjacent the outer end, a roof structure including a plurality of roof units corresponding to the number of side wall sections and means for adjustably supporting each roof unit from the corresponding side wall section, said roof units being disposed in overlapping relationship from the center unit outwardly toward both ends of said silo, said dryer comprising a plurality of flues supported in spaced side-by-side relationship between said side walls and extending longitudinally of said silo, means for closing the space between adjacent flues, each flue being open at one end for receiving air and closed at its opposite end, each flue having a longitudinal opening in the top covered by a grill for discharging air upwardly, vertical slideways on opposite sides of each flue adjacent each end, closure panels removably received in said slideways for closing the ends of the spaces between said flues and between the outermost flues and said side walls, sockets on opposite sides of each flue adjacent the open end, a front end wall disposed above said flues and having downwardly projecting bars received in said sockets, means for removably securing said front end wall to said flues, sockets on the closed ends of said flues, a rear wall disposed above said flues and having downwardly projecting bars received in said last named sockets, the side edges of said front and rear end walls being beveled to match the inclination of said side walls, a strip of flexible material secured to the lower side of the outermost flue on each side, said strip of material extending between said slideways and being secured to the adjacent side wall, whereby feed may be deposited on said flues between said side walls and end walls and air circulated upwardly through said feed to dry the same and a sheet of flexible material for disposition over the feed and means for securing the edges of said sheets to the top edges of said side walls and end walls, said sheet having apertures therein for the escape of air.

15. A portable horizontal silo and feed dryer, said silo comprising a pair of spaced side walls supported on the ground, each side wall being composed of removable sections placed end to end, whereby the horizontal length of said silo may be varied, means for securing said sections together, a brace for supporting each section, said brace including a foot member secured to a section adjacent the lower edge and projecting outwardly in engagement with the ground, a brace member secured to the section adjacent the upper edge and extending outwardly and downwardly and connected to said foot member adjacent the outer end, a roof structure including a plurality of roof units and means for adjustably supporting each roof unit from said side walls, said dryer comprising a plurality of flues supported in spaced side-by-side relationship between said side walls and extending longitudinally of said silo, means for closing the space between adjacent flues, each flue being open at one end for receiving air and closed at the opposite end, each flue having a longitudinal opening in the top covered by a grill for discharging air upwardly, means for closing the ends of the spaces between said flues and between the outermost flues and said side walls, a front end wall disposed above said flues, means for removably securing said front end wall to said flues, a rear end wall disposed above said flues and means for removably securing said rear end wall to said flues, whereby feed may be deposited on said flues between said side walls and end walls and air circulated upwardly through said feed to dry the same.

References Cited by the Examiner
UNITED STATES PATENTS

| | | | |
|---|---|---|---|
| 471,217 | 3/92 | Greenwald et al. | 50—48 |
| 1,188,289 | 6/16 | Levan | 50—48 |
| 1,987,903 | 1/35 | Houdry | 98—56 X |
| 2,398,441 | 4/46 | Moore | 50—48 |
| 2,815,001 | 12/57 | Hanson | 119—58 |
| 2,870,491 | 1/59 | Vincent | 20—1.4 |

FOREIGN PATENTS

| | | |
|---|---|---|
| 801,592 | 1/51 | Germany. |
| 6,868 | 1900 | Great Britain. |

NORMAN YUDKOFF, *Primary Examiner.*